2,763,660
1,3,4-OXADIAZOLE-SULFONAMIDES

Richard William Young, Riverside, Conn., assignor to American Cyanamid Company, New York, N. Y., a corporation of Maine No Drawing. Application June 23, 1954,
Serial No. 438,849

14 Claims. (Cl. 260—307)

This invention relates to a new series of organic compounds and methods for their preparation.

Among the methods and advantages of the present invention is a novel process for producing 1,3,4-oxadiazole-5-sulfonamides which are useful as antifouling agents for application to ships' bottoms. Because these compounds are capable of inhibiting the enzyme "carbonic anhydrase," they also find utility in the field of medicine, particularly in the treatment of diseases associated with fluid retention in the body tissues, as for example, congestive heart failure.

The class of compounds with which this invention is concerned may be represented by the formula $$R—SO_2—NR_1R_2$$

wherein R is an oxadiazole radical, such as 1,3,4-oxadiazole; a 2-lower alkyl-1,3,4-oxadiazole radical such as 2-methyl - 1,3,4 - oxadiazole, 2 - ethyl - 1,3,4 - oxadiazole, 2 - propyl - 1,3,4 - oxadiazole and 2 - butyl-1,3,4 - oxadiazole; a 2 - mononuclear aryl - 1,3,4 - oxadiazole radical such as 2-phenyl-1,3,4-oxadiazole, 2-p-chlorophenyl - 1,3,4 - oxadiazole, 2-o-chlorophenyl-1,3,4-oxadiazole, 2-(3,4-dichlorophenyl)-1,3,4-oxadiazole, 2-(4-nitrophenyl) - 1,3,4 - oxadiazole and 2-o-iodophenyl-1,3,4-oxadiazole; or a 2-aralkyl-1,3,4-oxadiazole radical such as 2-benzyl-1,3,4-oxadiazole and 2-p-nitrobenzyl-1,3,4-oxadiazole. $R_1$ and $R_2$ in the above formula may be a hydrogen atom, a lower alkyl, aralkyl or mononuclear aryl radical. As examples of these radicals may be given methyl, ethyl, propyl, benzyl, p-chlorobenzyl, phenyl, o-nitrophenyl and the like.

Various methods may occur to those skilled in the art for preparing the compounds of this invention. However, we have discovered a particularly useful process which we prefer to use for this purpose and it is intended that this process be included within the scope of the present invention.

The compounds of the present invention are prepared by suspending the mercapto derivative of a substituted or unsubstituted 1,3,4-oxadiazole in an aqueous acid solution and passing chlorine gas therethrough to obtain the corresponding sulfonyl chloride. This product is then treated with ammonia to produce the unsubstituted sulfonamide, or with an amine to produce compounds substituted on the sulfonamide group.

The addition of chlorine gas may take place at a temperature varying between —10° C. and 40° C., a range of 0° C. to 25° C. being preferred. The time of the reaction is not critical.

Either aqueous or liquid ammonia may be used to obtain the unsubstituted sulfonamide. Any alkylamine, aralkylamine or arylamine may be used in place of the ammonia if a substituted sulfonamide is desired, as for example methylamine, ethylamine, benzylamine, p-chlorbenzylamine, diphenylamine, p-nitrophenylamine, dimethylamine, methylethylamine, aniline in benzene and similar compounds.

The compounds of the present invention are high melting, white, crystalline solids, somewhat soluble in water and readily soluble in alcohols.

This invention will be further described in greater detail by the following specific examples. It should be understood however, that although these examples may set forth in particular detail some of the more specific features of the invention, they are given primarily for purposes of illustration and the invention in its broader aspects is not to be construed as limited thereto. All parts are by weight unless otherwise indicated.

Example I

A suspension of 3 parts of 2-phenyl-5-mercapto-1,3,4-oxadiazole in 100 parts of cold hydrochloric acid containing 20 parts of glacial acetic acid was kept at 5° to 10° C. while a stream of chlorine gas was admitted for a period of 1 hour. The suspension was filtered, the solid being washed with cold water and pressed dry. This solid was added portionwise to 50 parts of liquid ammonia; after spontaneous evaporation of the ammonia, the gummy residue was dissolved in 40 parts of water and filtered. Acidification of the filtrate with hydrochloric acid, filtering and drying gave a solid crop of 2-phenyl-1,3,4-oxadiazole-5-sulfonamide.

Example II

Chlorine gas was passed into a suspension of 3 parts of 2-p-chlorophenyl-5-mercapto-1,3,4-oxadiazole in a mixture of 400 parts of 1N hydrochloric acid in 100 parts of glacial acetic acid for 65 minutes while the temperature was kept at 0° to 5° C. The solid material was filtered off and washed with water, and after being pressed dry, was added portionwise to 75 cc. of liquid ammonia. The ammonia was allowed to evaporate and the residue suspended in 200 parts of water. The insoluble portion was filtered off and the filtrate acidified with concentrated hydrochloric acid to give 2-p-chlorophenyl-1,3,4-oxadiazole-5-sulfonamide.

Example III

A suspension of 2 parts of 2-o-chlorophenyl-5-mercapto-1,3,4-oxadiazole in 50 parts of 33% acetic acid was held at 15° to 25° C. while a rapid stream of chlorine gas was passed through the suspension for 45 minutes. The solid was filtered off and washed with cold water and added to 50 parts of cold, concentrated ammonium hydroxide. After acidification of the clarified solution there was obtained one part of 2-o-chlorophenyl-1,3,4-oxadiazole-5-sulfonamide as a colorless crystalline solid which could be recrystallized from hot water and was soluble in dilute alkali and precipitated by acids.

Example IV

2 - (3,4-dichlorophenyl)-1,3,4-oxadiazole-5-sulfonamide may be prepared in accordance with the method set forth in Example I, by suspending 2-(3,4-dichlorophenyl)-5-mercapto-1,3,5-oxadiazole in cold hydrochloric acid and passing chlorine gas through the solution for one hour while maintaining the temperature at 5° to 10° C. The suspension is filtered, the solid washed with cold water, pressed dry, and added, portionwise, to the liquid ammonia. After evaporation of the ammonia, the residue was dissolved in water, acidified with hydrochloric acid, filtered and dried. If desired, the product may be recrystallized from ethyl alcohol.

Example V

In accordance with the process set forth in Example I, 2-(4-nitro-phenyl)-5-mercapto-1,3,4-oxadiazole may be suspended in cold hydrochloric acid and chlorine gas passed through the solution for a period of one hour while the temperature is maintained at 5°–10° C. The suspension is filtered, the solid washed with cold water, pressed dry, and added portionwise to liquid ammonia. After evaporation of the ammonia, the residue is dissolved in water, acidified with hydrochloric acid, filtered and dried, to yield 2-(4-nitro-phenyl)-1,3,4-oxadiazole-5-sulfonamide.

Example VI 2-(o-iodophenyl)-1,3,4-oxadiazole-5-sulfonamide may be prepared in accordance with the method set forth in Example I by suspending 2-o-iodophenyl-5-mercapto-1,3,4-oxadiazole, in cold hydrochloric acid and passing chlorine gas through the solution for one hour while maintaining the temperature at 5°–10° C. The suspension is filtered, the solid washed with cold water, pressed dry, and added portionwise to the liquid ammonia. After evaporation of the ammonia, the residue is dissolved in water, acidified with hydrochloric acid, filtered and dried. If desired, the product may be recrystallized from alcohol.

Example VII 2-methyl-1,3,4-oxadiazole-5-sulfonamide may be prepared in accordance with the method set forth in Example I by suspending 2-methyl-5-mercapto-1,3,4-oxadiazole in cold hydrochloric acid and passing chlorine gas through the solution for one hour while maintaining the temperature from 5° to 10° C. The suspension is filtered, the solid washed with cold water, pressed dry, and added portionwise to the liquid ammonia. After evaporation of the ammonia, the residue is dissolved in water, acidified with hydrochloric acid, filtered and dried. If desired, the product may be recrystallized from alcohol.

Example VIII 2-propyl-1,3,4-oxadiazole-5-sulfonamide may be prepared in accordance with the method set forth in Example I by suspending 2-propyl-5-mercapto-1,3,4-oxadiazole in cold hydrochloric acid and passing chlorine gas through the solution for one hour while maintaining the temperature from 5° to 10° C. The suspension is filtered, the solid washed with cold water, pressed dry, and added portionwise to liquid ammonia. After evaporation of the ammonia, the residue is dissolved in water, acidified with hydrochloric acid, filtered and dried. If desired, the product may be recrystallized from alcohol.

Example IX 2-benzyl-1,3,4-oxadiazole-5-sulfonamide may be prepared in accordance with the method set forth in Example I by suspending 2-benzyl-5-mercapto-1,3,4-oxadiazole in cold hydrochloric acid and passing chlorine gas through the solution for one hour while maintaining the temperature at 5° to 10° C. The suspension is filtered, the solid washed with cold water, pressed dry and added portionwise to liquid ammonia. After evaporation of the ammonia, the residue is dissolved in water, acidified with hydrochloric acid, filtered and dried. If desired, the product may be recrystallized from ethyl alcohol.

Example X 2-p-nitrobenzyl-1,3,4-oxadiazole-5-sulfonamide may be prepared in accordance with the method set forth in Example I, by suspending 2-p-nitrobenzyl-5-mercapto-1,3,4-oxadiazole in cold hydrochloric acid and passing chlorine gas through the solution for one hour while maintaining the temperature at 5° to 10° C. The suspension is filtered, the solid washed with cold water, pressed dry, and added portionwise to liquid ammonia. After evaporation of the ammonia, the residue is dissolved in water, acidified with hydrochloric acid, filtered and dried. If desired, the product may be recrystallized from alcohol.

Example XI 1,3,4-oxadiazole-5-sulfonamide may be prepared in accordance with the method set forth in Example I, by suspending 5-mercapto-1,3,4-oxadiazole in cold hydrochloric acid and passing chlorine gas through the solution for one hour, maintaining the temperature at 5° to 10° C. The resulting suspension is filtered, the solid washed with cold water, pressed dry and added, portionwise to liquid ammonia. After evaporation of the ammonia, the residue is dissolved in water, acidified with hydrochloric acid, filtered and dried. If desired, the product may be recrystallized from ethyl alcohol.

Example XII 2-phenyl-5-mercapto-1,3,4-oxadiazole is converted to 2-phenyl-1,3,4-oxadiazole-5-sulfonyl chloride in accordance with Example I. The solid is added gradually to 25 parts of ethylamine with stirring in a cooling bath. The mixture is stirred two hours longer without chilling and the excess amine is allowed to evaporate. The residue is dissolved in dilute sodium hydroxide and the solution filtered. On addition of acid, the product, 2-phenyl-1,3,4-oxadiazole-5-sulfon-ethylamide, is obtained which may be filtered and recrystallized from ethanol.

Example XIII 2-phenyl-5-mercapto-1,3,4-oxadiazole is converted to 2-phenyl-1,3,4-oxadiazole-5-sulfonyl chloride in accordance with Example I. The solid is added gradually to 25 parts of dimethylamine with stirring in a cooling bath. The excess amine is allowed to evaporate by continued stirring without chilling. The residue is dissolved in dilute sodium hydroxide and the solution is filtered. The product, 2-phenyl-1,3,4-oxadiazole-5-sulfon-dimethylamide is precipitated out by the addition of acid, filtered and recrystallized from ethanol.

I claim:

1. Compounds having the general formula:

$$R-SO_2-NH_2$$

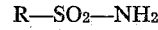

wherein R is a member selected from the group consisting of 2-lower alkyl 1,3,4-oxadiazole, 2-mononuclear aryl 1,3,4-oxadiazole and 2-lower-alkyl-substituted-mononuclear aryl 1,3,4-oxadiazole radicals.

2. The 2-lower alkyl-1,3,4-oxadiazole-5-sulfonamides.
3. 2-methyl-1,3,4-oxadiazole-5-sulfonamide.
4. The 2-mononuclear aryl-1,3,4-oxadiazole-4-sulfonamides.
5. 2-phenyl-1,3,4-oxadiazole-5-sulfonamide.
6. 2-p-chlorophenyl-1,3,4-oxadiazole-5-sulfonamide.
7. 2-o-chlorophenyl-1,3,4-oxadiazole-5-sulfonamide.
8. 2-(4-nitrophenyl)-1,3,4-oxadiazole-5-sulfonamide.
9. A method for preparing compounds having the general formula:

$$R-SO_2-NH_2$$

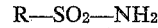

wherein R is a member selected from the group consisting of 2-lower alkyl 1,3,4-oxadiazole, 2-mononuclear aryl 1,3,4-oxadiazole and 2-lower-alkyl-substituted-mononuclear aryl 1,3,4-oxadiazole radicals which comprises treating a mercapto oxadiazole with chlorine in the presence of an aqueous acid solution and subsequently with ammonia.

10. A method for preparing 2-phenyl-1,3,4-oxadiazole-5-sulfonamide which comprises treating 2-phenyl-5-mercapto-1,3,4-oxadiazole with chlorine and mixing the resulting product with ammonia.

11. A method for preparing 2-p-chlorophenyl-1,3,4-oxadiazole-5-sulfonamide which comprises treating 2-p-chlorophenyl-5-mercapto-1,3,4-oxadiazole with chlorine and mixing the resulting product with ammonia.

12. A method for preparing 2-o-chlorophenyl-1,3,4-oxadiazole-5-sulfonamide which comprises treating 2-o-chlorophenyl-5-mercapto-1,3,4-oxadiazole with chlorine and mixing the resulting product with ammonia.

13. A method for preparing 2-methyl-1,3,4-oxadiazole-5-sulfonamide which comprises treating 2-methyl-5-mercapto-1,3,4-oxadiazole with chlorine and mixing the resulting product with ammonia.

14. A method for preparing 2-(4-nitrophenyl)-1,3,4-oxadiazole-5-sulfonamide which comprises treating 2-(4-nitrophenyl)-5-mercapto-1,3,4-oxadiazole with chlorine and reacting the resulting product with ammonia.

No references cited.